(12) United States Patent
Louie et al.

(10) Patent No.: US 12,108,905 B2
(45) Date of Patent: Oct. 8, 2024

(54) OPEN EXTRACT BEVERAGE DISPENSER AND METHOD FOR USING THE SAME

(71) Applicant: SANDORA HOUSEHOLD ELECTRIC APPLIANCES (SHENZHEN) LTD, Shenzhen (CN)

(72) Inventors: Waihang Louie, Shenzhen (CN); Kwokwai Wong, Shenzhen (CN); Changhai Yu, Shenzhen (CN); Marko Unger, Shenzhen (CN)

(73) Assignee: SANDORA HOUSEHOLD ELECTRIC APPLIANCES (SHENZHEN) LTD, Shenzhen (CN)

( * ) Notice: Subject to any disclaimer, the term of this patent is extended or adjusted under 35 U.S.C. 154(b) by 572 days.

(21) Appl. No.: 17/416,658

(22) PCT Filed: Apr. 24, 2021

(86) PCT No.: PCT/CN2021/089470
§ 371 (c)(1),
(2) Date: Jun. 21, 2021

(87) PCT Pub. No.: WO2022/134411
PCT Pub. Date: Jun. 30, 2022

(65) Prior Publication Data
US 2023/0172386 A1    Jun. 8, 2023

(30) Foreign Application Priority Data
Dec. 22, 2020 (CN) .......................... 202011534807.5

(51) Int. Cl.
*A47J 31/00* (2006.01)
*A47J 31/053* (2006.01)
(Continued)

(52) U.S. Cl.
CPC ........... *A47J 31/002* (2013.01); *A47J 31/053* (2013.01); *A47J 31/461* (2018.08); *A47J 31/04* (2013.01)

(58) Field of Classification Search
CPC ................................. A47J 31/053; A47J 31/04
(Continued)

(56) References Cited

U.S. PATENT DOCUMENTS

| 11,590,461 | B2 * | 2/2023 | Louie | ...................... A23F 5/243 |
| 2002/0029694 | A1 * | 3/2002 | Wong | .................... A47J 31/053 |
| | | | | 99/308 |
| 2009/0246341 | A1 * | 10/2009 | Pitner | ...................... A23F 3/16 |
| | | | | 99/298 |

FOREIGN PATENT DOCUMENTS

CN          110301818 A  * 10/2019  ............... A23L 2/54

* cited by examiner

*Primary Examiner* — Reginald Alexander
(74) *Attorney, Agent, or Firm* — Maier & Maier, PLLC (57) ABSTRACT

An open extract beverage dispenser and method for using the same. A storage device produces and stores liquid with nanobubbles, an extraction device is installed with an extraction part where a solid to be extracted is placed and a liquid storage part that accommodates the extraction part, and the storage device and extraction device are connected by a connection and circulation device. The extraction part and the liquid storage device are connected by a first conveyor in the connection and circulation device, which channels the liquid with nanobubbles to the extraction pant for mixing with the solid to be extracted; the extraction part and the liquid storage part are connected by a second conveyor in the connection and circulation device, which re-channels the liquid in the liquid storage part to the extraction part for re-mixing with the solid to be extracted.

7 Claims, 9 Drawing Sheets

(51) Int. Cl.
*A47J 31/46* (2006.01)
*A47J 31/04* (2006.01)

(58) Field of Classification Search
USPC .......................................................... 99/308
See application file for complete search history.

OPEN EXTRACT BEVERAGE DISPENSER AND METHOD FOR USING THE SAME

CROSS-REFERENCES TO RELATED APPLICATIONS

This application is a national stage application of PCT Patent Application No. PCT/CN2021/089470, filed on Apr. 24, 2021, which claims priority to Chinese Patent Application No. 202011534807.5, filed on Dec. 22, 2020, the content of all of which is incorporated herein by reference.

FIELD

The present disclosure relates to the field of household appliances for extract beverages, particularly relating to an open extract beverage dispenser and method for using the same.

BACKGROUND

Methods of preparing beverages through extraction of ingredients in solids usually extract powders including coffee powder, Chinese, Western and Japanese tea powder, and herbal tea powder through beverage extraction methods. Such methods that prepare beverages through extraction generally require placing the powder of a solid to be extracted in a container, pouring water, stirring and steeping to complete the extraction process. This process is time-consuming, extracts insufficient ingredients, and results in poor texture of the beverage.

In order to reduce the extraction time, liquid with nanobubbles (such as nanobubble water) may be used as the extraction liquid. By bursting nanobubbles during extraction, soluble ingredients in solid powder come into full contact with the liquid, thereby reducing the time taken for extraction and increasing the extracted ingredients. However, in prior art, the complete bursting of nanobubbles in liquid cannot be guaranteed, thereby causing a poor extraction effect of ingredients in the solid to be extracted, making it impossible to increase the concentration and resulting in a poor beverage texture.

Therefore, there is room for the improvement and development of the prior art.

SUMMARY

In view of the aforementioned shortcomings of the prior art, the objective of the present disclosure is to provide an open extract beverage dispenser and method for using the same in order to solve the problem in the prior art, namely the insufficient degree of extraction of ingredients in solids through extraction preparation of beverages. This problem makes it impossible to increase the concentration and results in a poor beverage texture.

The technical solution of the present disclosure is as follows:

An open extract beverage dispenser, in which comprising:
a storage device, used to produce and store liquid with nanobubbles;
a connection and circulation device, of which one end is connected to the storage device;
an extraction device, which is connected to the other end of the connection and circulation device, and the extraction device comprises an extraction part where a solid to be extracted is placed and a liquid storage part that accommodates the extraction part, and the liquid with nanobubbles flows into the liquid storage part from the extraction part after the extraction of the solid to be extracted;
the connection and circulation device comprises a first conveyor and a second conveyor, where the first conveyor connects the extraction part and the liquid storage device and channels the liquid with nanobubbles into the extraction part for mixing with the solid to be extracted, the second conveyor connects the liquid storage part and the extraction part and re-channels solution in the liquid storage part into the extraction part for re-mixing with the solid to be extracted.

The extraction device in the open extract beverage dispenser further comprises an energy generation device, which is installed below the extraction part and is used to emit energy to accelerate the bursting of nanobubbles of solution in the extraction part and the liquid storage part.

The extraction device in the open extract beverage dispenser further comprises:
a partition, which is snap-fit in the liquid storage part, installed between the extraction part and the energy generation device, and in direct contact with the bottom of the extraction part, and the solution flows into the space above the partition in the liquid storage part from the extraction part after the extraction of the solid to be extracted using liquid with nanobubbles;
a first duct, which penetrates the partition, and the solution stored in the space above the partition in the liquid storage part enters the space below the partition in the liquid storage part through the first duct.

The liquid storage part in the open extract beverage dispenser comprises:
a liquid outlet, which is installed at the bottom of the liquid storage part;
a three-way device, which is installed below the partition, the first end of the three-way device is connected to the first duct of the partition, the second end of the three-way device is connected to the second conveyor, and the third end of the three-way device is connected to the liquid outlet;
a control valve, which is installed at one side of the three-way device and connected to the three-way device to control the flow of the three-way device.

In the open extract beverage dispenser, a top cover is set above the extraction device and the top cover is embedded with a second duct and a third duct, one end of the second duct is connected to the first conveyor, and the other end of the second duct is installed at the top of the extraction part and used to drip the liquid with nanobubbles into the extraction part; one end of the third duct is connected to the second conveyor, and the other end of the third duct is installed at the top of the extraction part and used to drip solution in the liquid storage part into the extraction part.

In the open extract beverage dispenser, an air pump is further set at the top of the connection and circulation device, the air pump is connected to the storage device and is used to deliver air to the storage device for the production of nanobubbles.

The storage device in the open extract beverage dispenser comprises:
a storage part, which is installed above the storage device, connected to the first conveyor, and used to store the liquid with nanobubbles;
a nanobubble production device, which is installed below the storage part and used to convert air delivered by the air pump into nanobubbles for mixing with liquid, so as to obtain the liquid with nanobubbles;

a power supply device, which is installed below the nanobubble production device and connected to an external power source to supply energy to the open extract beverage dispenser.

In the open extract beverage dispenser, the first conveyor and the second conveyor are liquid drawing power devices and the side walls and bottom of the extraction part are filter mesh.

A method for using any of the aforementioned open extract beverage dispensers, in which comprising steps of:

S100: adding liquid to the storage device, turning on the air pump and nanobubble production device, producing liquid with nanobubbles and storing the liquid with nanobubbles in the storage device;

S200: the first conveyor drawing the liquid with nanobubbles from the storage device and dripping the liquid with nanobubbles into the extraction part of the extraction device through the second duct for mixing with the solid to be extracted;

S300: the solution of the liquid with nanobubbles and the solid to be extracted entering the liquid storage part, the second conveyor drawing the solution in the liquid storage part, and dripping the solution through the third duct into the extraction part for re-mixing with the solid to be extracted;

S400: outputting the fully extracted liquid from the liquid outlet below the liquid storage part.

The method for using the open extract beverage dispenser, in which S300 particularly comprises:

S310: the extraction part separating the solution and powder of the solid to be extracted, and the separated solution entering the liquid storage part;

S320: the energy generation device below the partition emitting energy, bursting the nanobubbles in the solution stored in the space above the partition in the liquid storage part;

S330: the second conveyor drawing the solution in the liquid storage part and dripping the solution through the third duct into the extraction part for re-mixing with the solid to be extracted;

S340: repeating steps S310-S330 until nanobubbles in the liquid completely burst.

As compared to the prior art, the present disclosure provides an open extract beverage dispenser and method for using the same. A storage device produces and stores liquid with nanobubbles, an extraction device is installed with an extraction part where a solid to be extracted is placed and a liquid storage part that accommodates the extraction part, and the storage device and extraction device are connected by a connection and circulation device. The extraction part and the liquid storage device are connected by a first conveyor in the connection and circulation device, which channels the liquid with nanobubbles to the extraction part for mixing with the solid to be extracted; the extraction part and the liquid storage part are connected by a second conveyor in the connection and circulation device, which re-channels the liquid in the liquid storage part to the extraction part for re-mixing with the solid to be extracted. Extraction of the solid by circulating the liquid with nanobubbles realizes the complete bursting of nanobubbles in the liquid, reducing the extraction time, increasing the extraction efficiency, and increasing the concentration of the beverage while ensuring the texture of the beverage.

DETAILED DESCRIPTION OF THE EMBODIMENTS

The present disclosure provides an open extract beverage dispenser and method for using the same. In order to make the objectives, technical solution and effects of the present disclosure clearer and more specific, the present disclosure will be described in further detail below. It should be understood that the specific embodiments described here are only used to explain the present disclosure, and are not used to limit the present disclosure.

It should be noted that the orientational and positional relationships indicated by the terms "center", "upper/above", "lower/below", "left", "right", "inner/inside", "outer/outside", "vertical/perpendicular", "horizontal/level", etc. are based on the orientational and positional relationships indicated by the drawings. They are only for the convenience of describing the present disclosure and simplifying the description, and are not for indicating or implying that the structure referred to must have a specific orientation or must be constructed in a specific orientation, nor shall they be understood as limitations of the present disclosure.

In addition, unless the article is specifically defined by the context, "a" and "the" may generally refer to a single item or a plurality of items. If there are descriptions of "first", "second" and the like in the embodiments of the present disclosure, the descriptions of "first", "second" and the like are only for the purpose of description, and shall not be understood as indicating or implying their relative importance or implicitly indicating the number of technical features referred to. Thus, features defined as "first" and "second" may explicitly or implicitly include at least one of such features. In addition, the technical solutions between the various embodiments may be combined with each other, but they must be based on what may be realized by those of ordinary skill in the art. Where the combination of technical solutions is contradictory or cannot be realized, it should be considered that such a combination of technical solutions does not exist and is not within the claimed scope of protection of the present disclosure.

Figure 1:
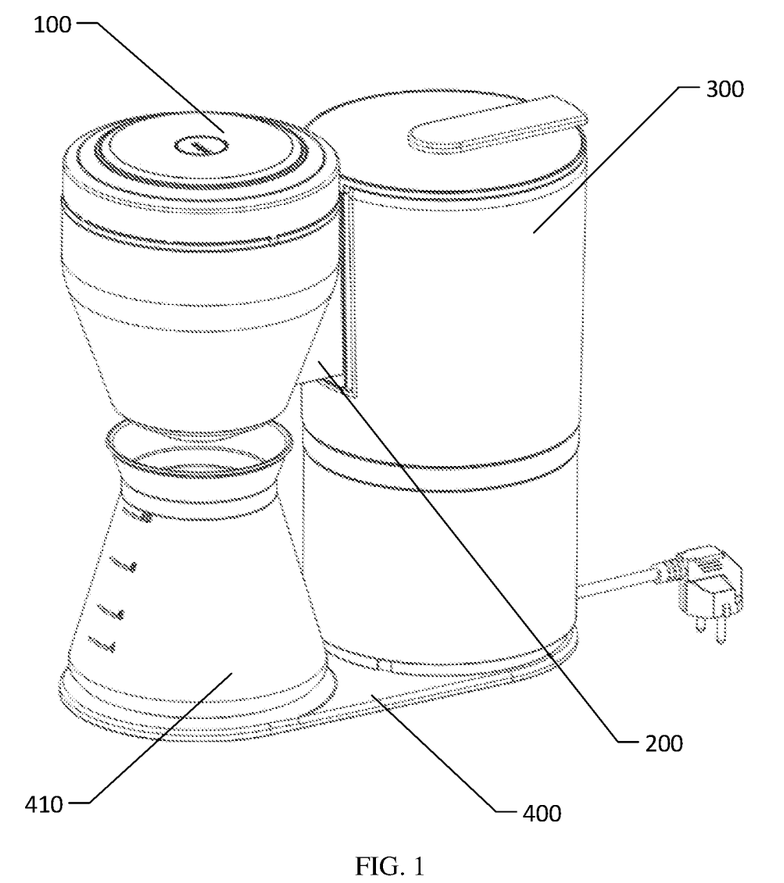
FIG. 1 is a three-dimensional diagram of an open extract beverage dispenser of the present disclosure.

The present disclosure provides an open extract beverage dispenser, as shown in FIG. 1, the open extract beverage dispenser comprises an extraction device 100, a connection and circulation device 200, a storage device 300 and a base 400. The storage device 300 is installed on the base 400 and is used to store and provide liquid; the extraction device 100 is installed at one side of the storage device 300 and is used for the placement of a solid to be extracted and to provide space for liquid extraction of the solid; the connection and circulation device 200 is installed between the extraction device 100 and storage device 300, where one end of the connection and circulation device 200 is connected to the storage device 300 and the other end is connected to the extraction device 100. The extraction device 100 is connected to the storage device 300 through the connection and circulation device 200, and realizes circulatory and repeated liquid extraction of the solid to be extracted in the extraction device 100 through the connection and circulation device 200. A pot body 410 is set on the base 400 below the corresponding extraction device 100 and is used to receive the beverage extracted and prepared by the extraction device 100. Optionally, the solid to be extracted is coffee powder, Chinese, Western or Japanese tea powder, or herbal powder, and the liquid is water.

Figure 2:
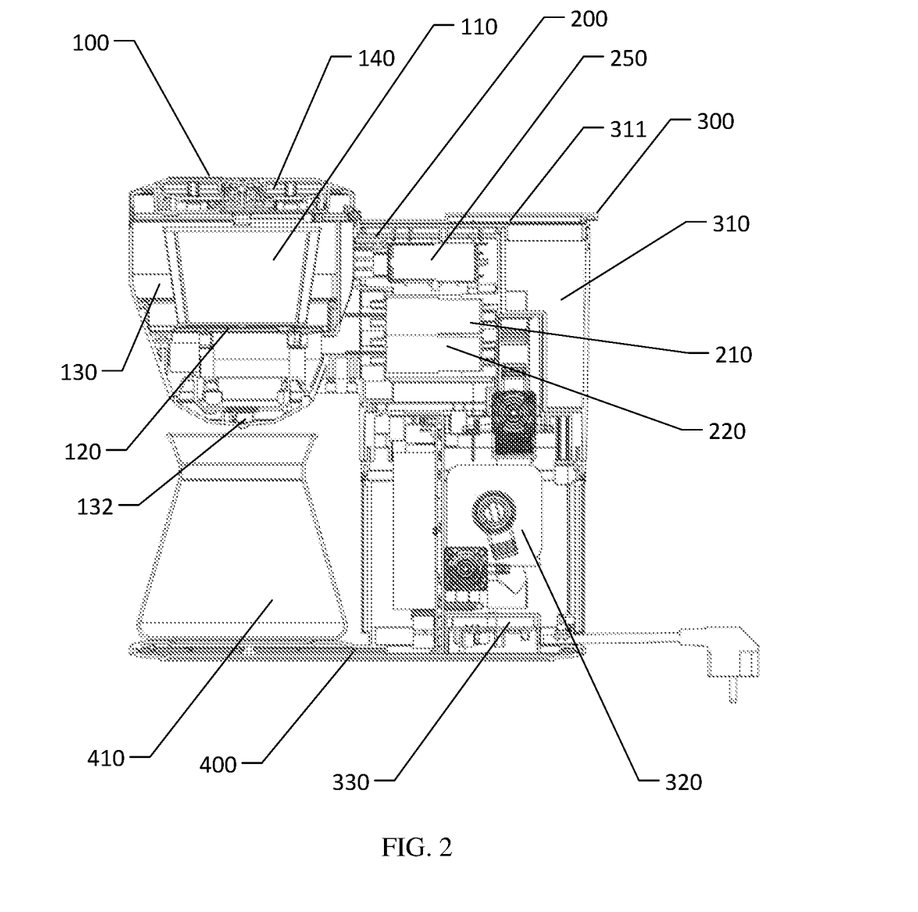
FIG. 2 is a cross-sectional diagram of an open extract beverage dispenser of the present disclosure.
Figure 3:
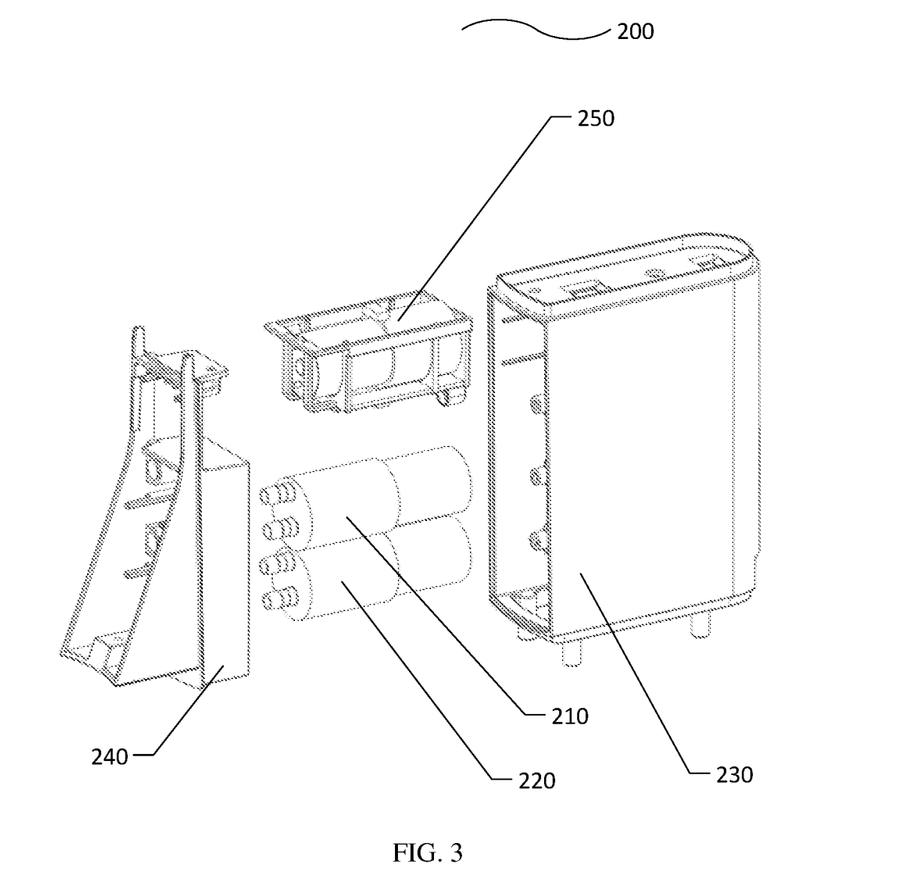
FIG. 3 is an exploded-view diagram of a connection and circulation device in an open extract beverage dispenser of the present disclosure.

As shown in FIG. 2 and FIG. 3, the connection and circulation device 200 comprises a first conveyor 210, a second conveyor 220, a first shell 230, a second shell 240, and an air pump 250. The air pump 250 is installed at the top of the connection and circulation device 200, the air pump 250 is connected to the storage device 300 and is used to deliver air to the storage device 300 for the storage device 300 to produce nanobubbles and the liquid with nanobubbles. Further, the air pump 250 is installed at a position higher than the liquid surface of the liquid in the storage device 300 to prevent liquid from backflowing into the air pump 250, damaging the air pump 250.

As shown in FIG. 2 and FIG. 3, the first conveyor 210 and the second conveyor 220 are installed in the connection and circulation device 200. The first conveyor 210 is connected to the storage device 300 and extraction device 100 and delivers liquid with nanobubbles produced and stored by the storage device 300 to the extraction device 100. Liquid with nanobubbles drip from above the extraction device 100 and after coming into contact with the solid to be extracted, flows downwards to the bottom of the extraction device 100 and realizes the extraction of the solid to be extracted by bursting nanobubbles in the liquid with nanobubbles. The second conveyor 220 is installed in parallel below the first conveyor 210. The second conveyor 220 is connected to the bottom of the extraction device 100 and the top of the extraction device 100 and delivers solution in contact with the solid to be extracted from the bottom of the extraction device 100 to above the extraction device 100 for dripping again, so that the solution comes into contact again with the solid to be extracted. The relative positions of the first conveyor 210 and the second conveyor 220 may be arbitrarily changed, such as by installing the second conveyor 220 above the first conveyor 210 or installing the first conveyor 210 and the second conveyor 220 on the same horizontal plane. Alternatively, the first conveyor 210 and the second conveyor 220 are liquid drawing power devices. Alternatively, the first conveyor 210 and the second conveyor 220 are several liquid drawing power devices connected in a series. Repeatedly circulating the liquid with nanobubbles for it to come into contact with the solid to be extracted guarantees the complete bursting of nanobubbles, thereby increasing the concentration of extracted ingredients in the liquid and improving the texture of the beverage.

Figure 6:
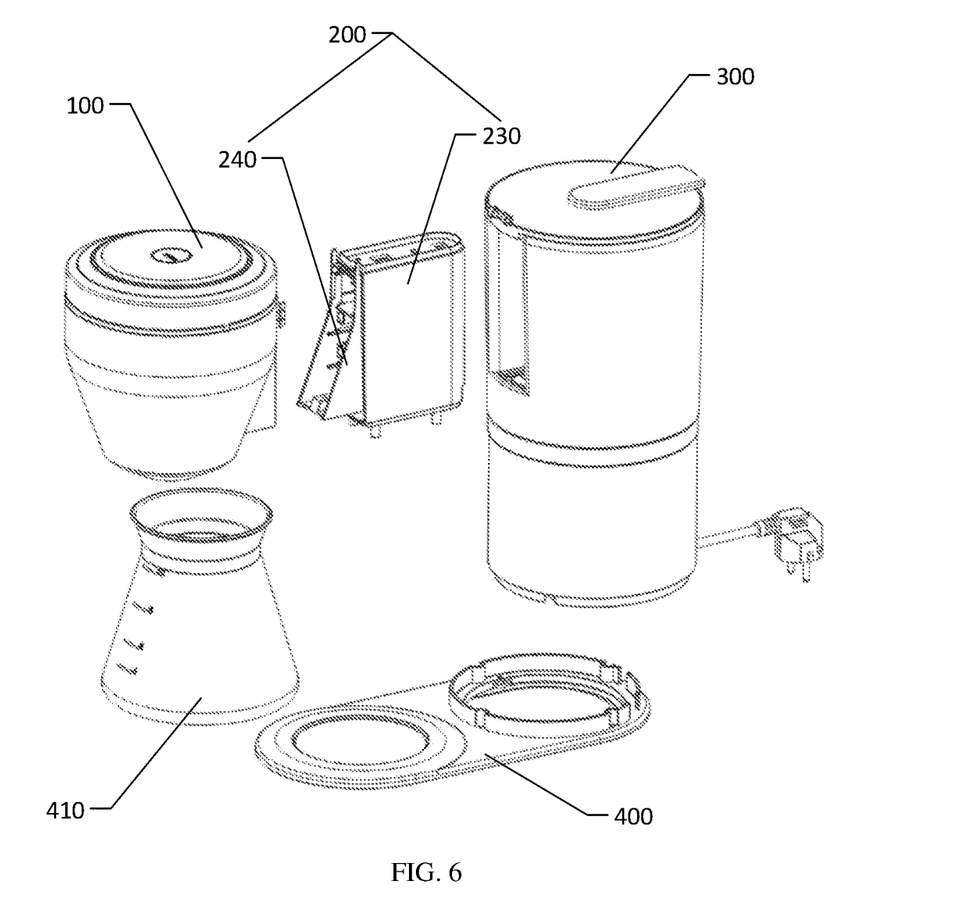
FIG. 6 is an assembly schematic diagram of an open extract beverage dispenser of the present disclosure.

As shown in FIG. 3 and FIG. 6, the fastened first shell 230 and second shell 240 accommodate the first conveyor 210, the second conveyor 220 and the air pump 250 to prevent the first conveyor 210, the second conveyor 220 and the connection of the air pump 250 to the storage device 300 and the extraction device 100 from being affected by reasons such as vibrations during use. The first shell 230 is detachably installed in the storage device 300. For example, a fixed column is installed on the first shell 230 and a fixed groove is installed on the storage device 300, and inserting the fixed column on the first shell 230 into the fixed groove of the storage device 300 realizes detachable connection between the first shell 230 and the storage device 300. The second shell 240 is detachably connected to the extraction device 100. For example, a buckle is installed on the extraction device 100 and a slot is installed on the second shell 240 to realize snap-fit connection of the second shell 240 and the extraction device 100. The first shell 230 and the second shell 240 are snap-fit to realize detachable connection of the extraction device 100 and the storage device 300. The connection method of the first shell 230 and the storage device 300, the connection method of the second shell 240 and the extraction device 100, and the connection method of the first shell 230 and the second shell 240 may be freely alternated, as long as they are detachably connected to each other for ease of disassembly and cleaning of the open extract beverage dispenser of the present disclosure.

Figure 4:
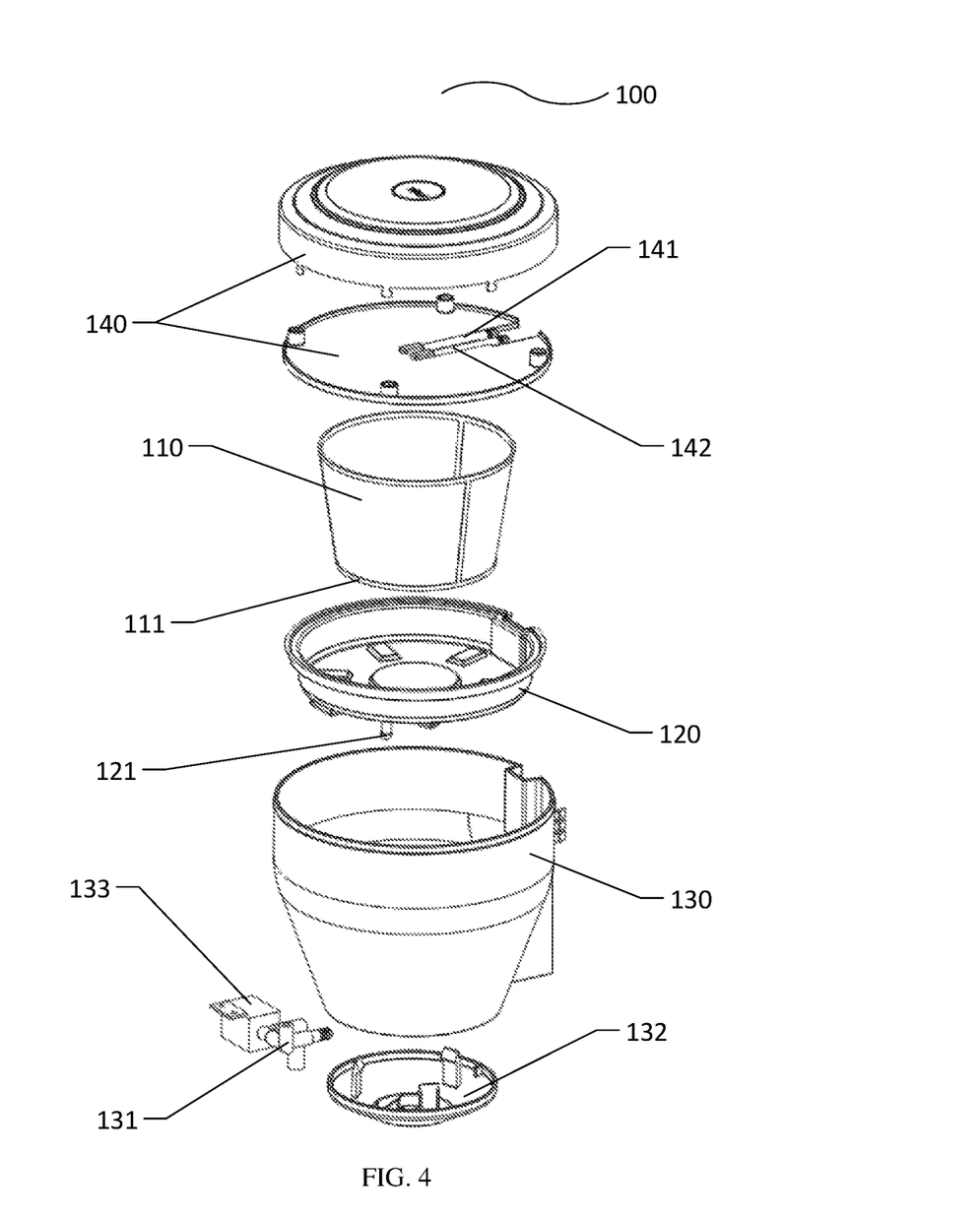
FIG. 4 is an exploded-view diagram of an extraction device in an open extract beverage dispenser of the present disclosure.

As shown in FIG. 4, the extraction device 100 comprises a top cover 140, an extraction part 110, a partition 120 and a liquid storage part 130. Optionally, both the extraction part 110 and the liquid storage part 130 are barrel-shaped, the volume of the extraction part 110 is smaller than the volume of the liquid storage part 130, and the liquid storage part 130 accommodates the extraction part 110. As shown in FIG. 2, the partition 120 is installed in the center of the liquid storage part 130 and the extraction part 110 is placed above the partition 120. The top cover 140 is installed above the extraction part 110 and seals the extraction part 110 and the liquid storage part 130. A solid to be extracted is placed at the bottom of the extraction part 110, liquid with nanobubbles is dripped from the top of the extraction part 110 and flows into the liquid storage part 130 after coming into contact with the solid to be extracted at the bottom of the extraction part 110, realizing the extraction of active ingredients in the solid to be extracted by bursting nanobubbles in the liquid with nanobubbles. Further, the side walls and bottom of the extraction part 110 are filter mesh 111. Liquid with nanobubbles and the solution in contact with the solid to be extracted are filtered through the filter mesh 111 and flow into the liquid storage part 130 to ensure that there is no residual solid powder in the solution, improving the quality of the final beverage prepared and making the texture of the beverage smoother.

Figure 7:
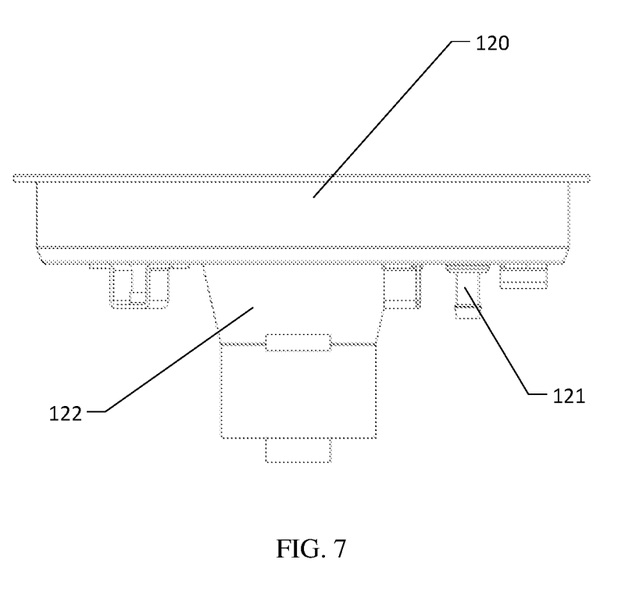
FIG. 7 is an assembly schematic diagram of an energy generation device in an embodiment of an open extract beverage dispenser of the present disclosure.

As shown in FIG. 2, the partition 120 separates the liquid storage part 130 into a space above the partition 120 and a space below the partition 120, and the solution that flows out from the extraction part 110 is stored in the space above the partition 120 in the liquid storage part 130. As shown in FIG. 4 and FIG. 7, a first duct 121 is set on the partition 120 and the solution stored in the space above the partition 120 in the liquid storage part 130 flows into the space below the partition 120 in the liquid storage part 130 through the first duct 121. As shown in FIG. 7, an energy generation device 122 is set below the partition 120, that is, the energy generation device 122 is installed below the extraction part 110 and the partition 120 is installed between the extraction part 110 and the energy generation device 122. The energy generation device 122 emits energy to accelerate the bursting of nanobubbles in the solution, so as to ensure that the ingredients in the solid to be extracted are fully dissolved in the solution. As the extraction part 110 is in direct contact with the partition 120, liquid with nanobubbles receives energy emitted by the energy generation device 122 during contact with the solid to be extracted, realizing accelerated bursting of nanobubbles during extraction, and the solution stored in the space above the partition 120 in the liquid storage part 130 also receives energy emitted by the energy generation device 122, realizing accelerated bursting of nanobubbles. Bursting nanobubbles in the solution increases the dissolution effect of extracted ingredients in the solid, ensuring the concentration of the extract and improving the texture of the final beverage prepared. Further, the energy generation device 122 is an ultrasonic wave generator or sonic wave generator. As long as the energy generation device 122 is able to emit energy to burst nanobubbles, no limitation is made here on the specific device or device model used.

Furthermore, the second conveyor 220 in the connection and circulation device 200 is used to drip the solution in the liquid storage part 130 into the extraction part 110 again and after the solution comes into contact with the solid to be extracted at the bottom of the extraction part 110 again, energy emitted by the energy generation device 122 accelerates the bursting of nanobubbles again. The aforementioned steps are repeated and after multiple circulations and deliveries, the complete bursting of nanobubbles in the liquid with nanobubbles may be guaranteed within a short time, thereby increasing the concentration of extracted ingredients in the solution and improving the texture of the beverage.

As shown in FIG. 2 and FIG. 4, a liquid outlet 132 is set at the bottom of the liquid storage part 130, the liquid outlet 132 corresponds to the installation of the pot body 410, and may drip the beverage extracted and prepared in the liquid storage part 130 into the pot body 410. A three-way device 131 is set below the partition 120 in the liquid storage part 130. A first end of the three-way device 131 is connected to the first duct 121 and the solution stored in the space above the partition 120 in the liquid storage part 130 flows into the three-way device 131 through the first duct 121; a second end of the three-way device 131 is installed in a horizontal direction, extends towards the side walls of the liquid storage part 130 and is connected to the second conveyor 220 in the connection and circulation device 200, allowing the solution in the liquid storage part 130 to drip into the extraction part 110 again through the second conveyor 220; a third end of the three-way device 131 is installed in a vertical direction, extends towards the liquid outlet 132 and is connected to the liquid outlet 132, allowing the solution in the liquid storage part 130 to flow out from the liquid outlet 132.

As shown in FIG. 4, one side of the three-way device 131 is connected to a control valve 133 and the flow of the three-way device 131 is controlled through the control valve 133. When circulatory extraction is required, the control valve 133 controls flow of the first end and second end and seals the third end of the three-way device 131. At this time, the liquid storage part 130 is connected to the second conveyor 220 through the three-way device 131, the second conveyor 220 delivers the solution in the liquid storage part 130, dripping it into the extraction part 110 again through the second conveyor 220, so that the solution comes into contact with the solid to be extracted at the bottom of the extraction part 110 again, bursting nanobubbles again during the second extraction. Pre-setting the circulation time, such as by setting circulation to five minutes, ensures the complete bursting of nanobubbles in the beverage, thereby realizing complete extraction of the solid. When extraction is complete and the beverage needs to be outputted, the control valve 133 controls the flow of the first end and the third end and seals the second end of the three-way device 131. At this time, the liquid storage part 130 is connected to the liquid outlet 132 and the fully extracted beverage in the liquid storage part 130 drips into the pot body 410 through the liquid outlet 132.

As shown in FIG. 4, the top cover 140 is embedded with a second duct 141 and a third duct 142. One end of the second duct 141 is connected to the first conveyor 210, and the other end of the second duct 141 extends downwards from the center of the top cover 140. One end of the third duct 142 is connected to the second conveyor 220, that is, one end of the second conveyor 220 is connected to the second end of the three-way device 131, and the other end of the second conveyor 220 is connected to the third duct 142. The other end of the third duct 142 extends downwards from the center of the top cover 140. The top cover 140 is fastened to the extraction device 100, the other end of the second duct 141 and the other end of the third duct 142 extend downwards from the center of the top of the extraction part 110, thereby realizing the dripping of liquid with nanobubbles from the storage device 300 into the extraction part 110 through the second duct 141 for contact with the solid to be extracted, and the third duct 142 realizes the dripping of solution in the liquid storage part 130 into the extraction part 110 for contact with the solid to be extracted.

Figure 5:
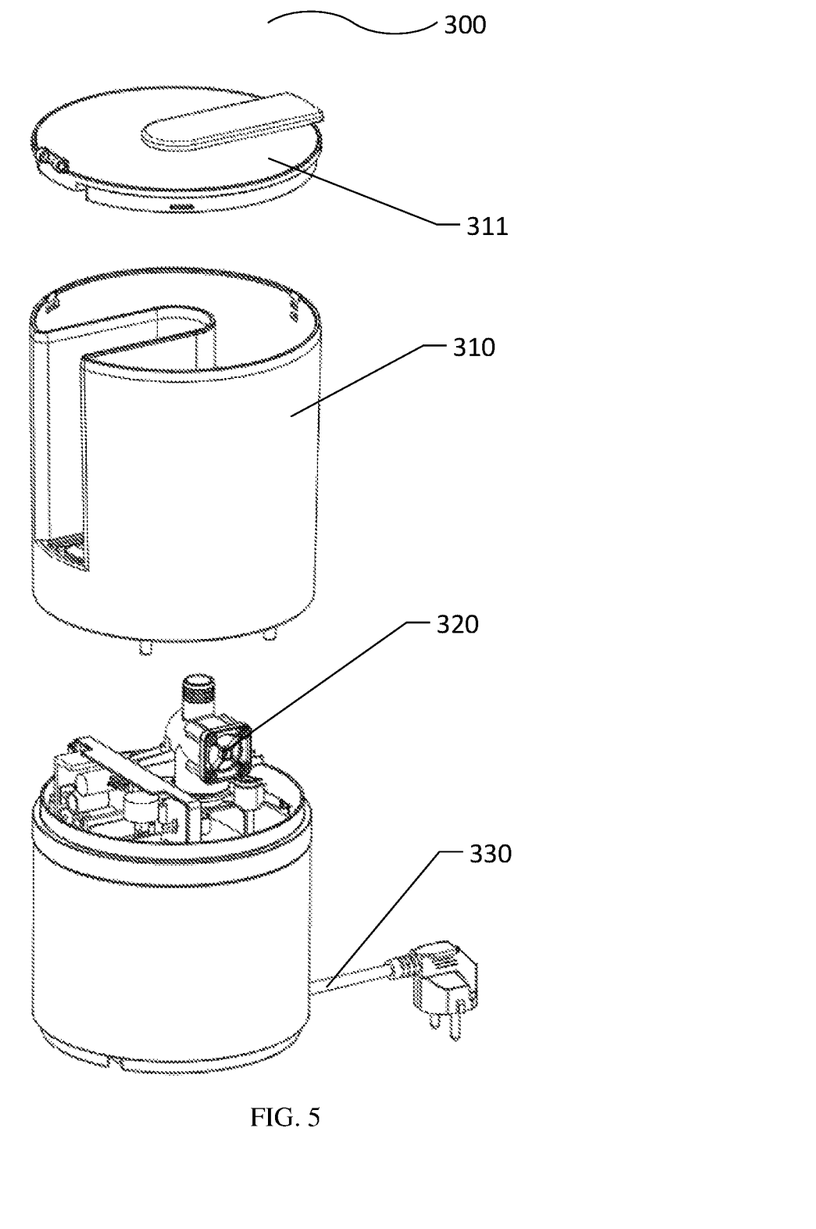
FIG. 5 is an exploded-view diagram of a storage device in an open extract beverage dispenser of the present disclosure.

As shown in FIG. 2 and FIG. 5, the storage device 300 comprises a storage part 310, a nanobubble production device 320 and a power supply device 330. The storage part 310 is installed at the top of the storage device 300 and the top opening of the storage part 310 and one side of the storage part 310 are connected to the extraction device 100 through the connection and circulation device 200. A storage cover 311 is also set at the top opening of the storage part 310. The storage cover 311 is opened for ease of use when adding water and after adding water, the storage cover 311 is closed to seal the storage part 310, so as to prevent dust and other substances from falling into the liquid in the storage part 310. One end of the first conveyor 210 is connected to the storage part 310 and the other end is connected to the second duct 141, thereby the liquid in the storage part 310 may be delivered and dripped into the extraction part 110 of the extraction device 100 through the second duct 141.

The nanobubble production device 320 is installed below the storage part 310 and is respectively connected to the storage part 310 and the air pump 250 in the connection and circulation device 200. The nanobubble production device 320 converts air delivered by the air pump 250 into nanobubbles for mixing with the liquid in the storage part 310, thereby producing liquid with nanobubbles, and delivers the liquid with nanobubbles back to the storage part 310 for storage.

In an optional embodiment, the nanobubble production device 320 comprises an air pump 250, as well as a liquid circulating pump, an air delivery component, a rough component, a liquid inlet pipe, and a liquid outlet pipe. The air delivery component is installed in a form comprising micropores or microslits and the rough component comprises micropores or microslits to disperse air bubbles in the liquid. When liquid passes through the air delivery component, the liquid circulating pump produces high-speed liquid flow and the liquid speed increases suddenly to reduce the pressure on the surface of the air delivery component near the micropores or microslits. Air bubbles on the surface of micropores or microslits are subject to a strong separating force and produce microbubbles and even nanobubbles, microbubbles and nanobubbles are sucked into the liquid circulating pump and forced to disperse on the rough component so as to produce more uniform and stable nanobubbles. Nanobubbles of different concentrations and diameters may be produced by controlling air flow, liquid flow and the roughness of the rough component. A nanobubble production device installed with this structure may produce nanobubbles with a diameter smaller than 300 nm. At the same time, the concentration of nanobubbles in liquid is at least $1\times10^7$ units/L. The nanobubble production device 320 may be any device that produces nanobubbles, such as devices that produce oxidized air bubbles, and no limitation is made here.

Further, a bubble circulating device is set in the nanobubble production device 320. The bubble circulating device collects air bubbles that are not stably mixed with the liquid (such as microbubbles) and delivers such air bubbles to the air delivery component again to further process air bubbles and reduce the diameter of air bubbles, so as to guarantee that all air bubbles are converted into nanobubbles for mixing with liquid, thereby increasing the concentration of nanobubbles in liquid.

A power supply device 330 is also installed at the bottom of the storage device 300, below the storage part 310 and the nanobubble production device 320. The power supply device 330 is fixed on the base 400 and may be connected to an external power source. The power supply device 330 and the nanobubble production device 320, the first conveyor 210, the second conveyor 220, the air pump 250 and the energy generation device 122 are electrically connected to provide power to the open extract beverage dispenser of the present disclosure during work.

The working process of the open extract beverage dispenser of the present disclosure is briefly described below using extract coffee as an example: water is added to the storage part 310 and coffee powder is placed at the bottom of the extraction part 110. After closing the storage cover 311 and the top cover 140, the power supply device 330 is connected to an external power source. The air pump 250 delivers air to the nanobubble production device 320, the nanobubble production device 320 converts air into nanobubbles and mixes it with water in the storage part 310, and nanobubble water obtained is stored in the storage part 310. The first conveyor 210 delivers nanobubble water in the storage part 310 and drips it into the extraction part 110 through the second duct 141. After nanobubble water is mixed with coffee powder at the bottom of the extraction part 110, nanobubbles burst under the action of the energy generation device 122, realizing the extraction of coffee powder. Coffee liquid that has undergone one extraction flows into the liquid storage part 130 after the extraction part 110 filters the coffee powder, and flows into the three-way device 131 through the first duct 121 on the partition 120. Coffee liquid flows into the second conveyor 220 through the first end and second end of the three-way device 131. The second conveyor 220 delivers and drips coffee liquid in the liquid storage part 130 into the extraction part 110 again through the third duct 142 for contact with the coffee powder a second time, and nanobubbles further burst under the action of the energy generation device 122, realizing the second extraction of coffee powder. The above steps are repeated for the pre-set circulation time. The control valve 133 controls the flow of the first end and third end of the three-way device 131 and seals the second end. At this time, the fully extracted beverage drips into the pot body 410 through the liquid outlet 132 and the power source is turned off. Circulatory extraction of coffee powder completely bursts nanobubbles in nanobubble water, thereby ensuring good extraction effects of coffee powder in water while reducing extraction time, and the final coffee liquid prepared has a high coffee concentration and good texture.

Figure 8:
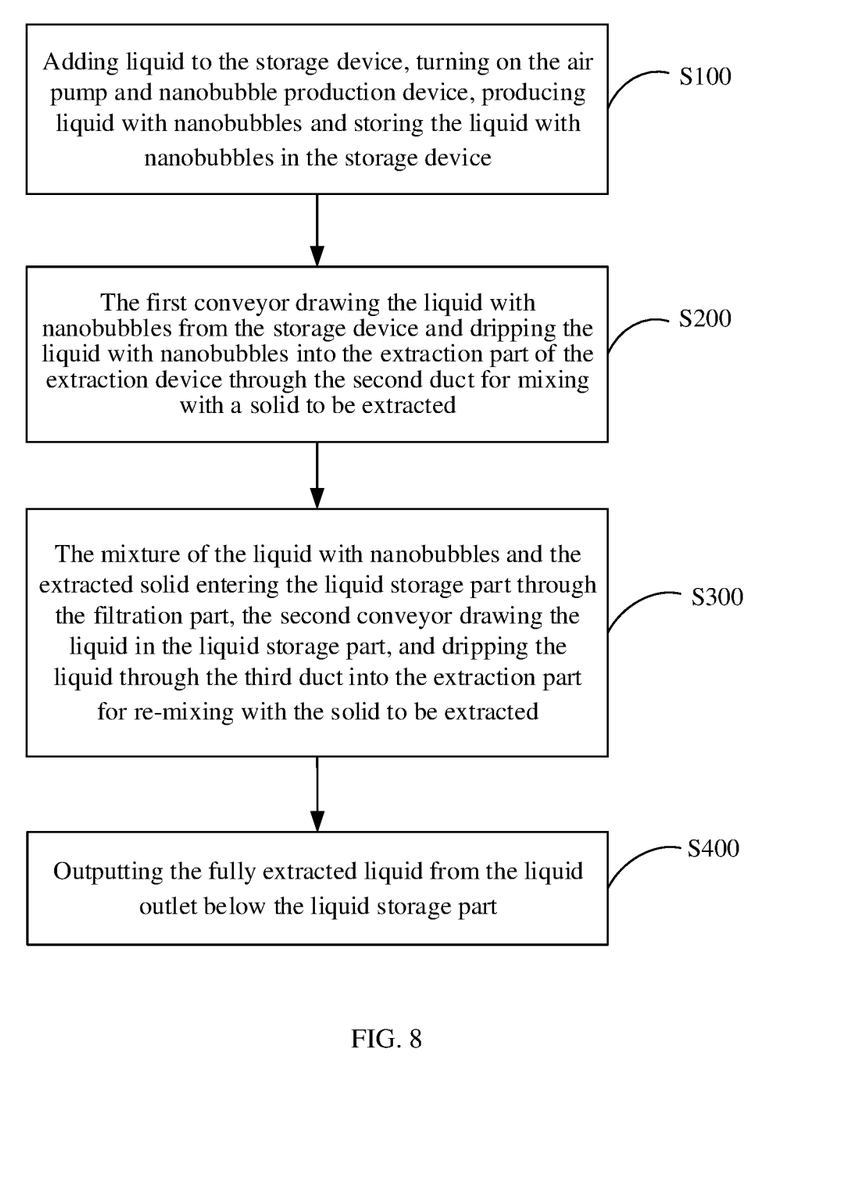
FIG. 8 is a flowchart of a method for using an open extract beverage dispenser of the present disclosure.

As shown in FIG. 8, the present disclosure further provides a method for using the open extract beverage dispenser, comprising steps of:

S100: adding liquid to the storage device, turning on the air pump and nanobubble production device, producing liquid with nanobubbles and storing the liquid with nanobubbles in the storage device;

S200: the first conveyor drawing the liquid with nanobubbles from the storage device and dripping the liquid with nanobubbles into the extraction part of the extraction device through the second duct for mixing with the solid to be extracted;

S300: the mixture of the liquid with nanobubbles and the solid to be extracted entering the liquid storage part, the second conveyor drawing the solution in the liquid storage part, and dripping the solution through the third duct into the extraction part for re-mixing with the solid to be extracted;

S400: repeating S300 until nanobubbles completely burst and outputting the fully extracted liquid from the liquid outlet below the liquid storage part.

Figure 9:
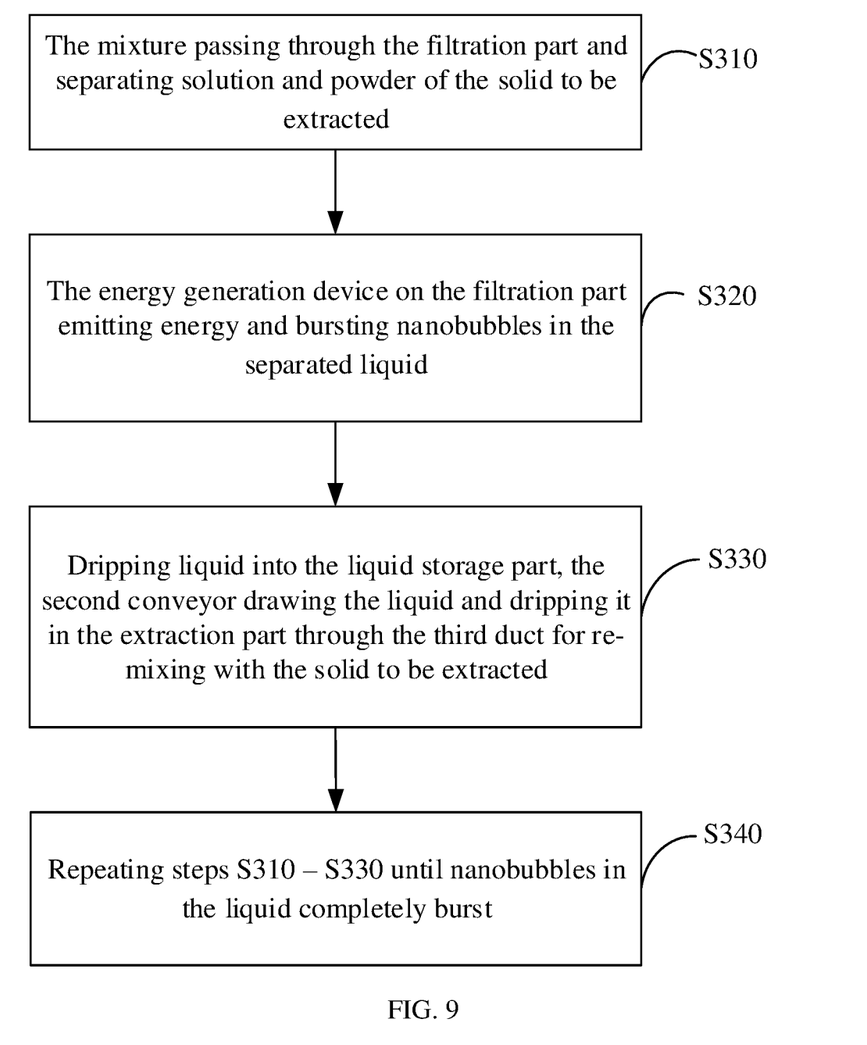
FIG. 9 is a detailed flowchart of step S300 of a method for using an open extract beverage dispenser of the present disclosure.

As shown in FIG. 9, in order to ensure that nanobubbles in the liquid completely burst, step S300 particularly comprises:

S310: the extraction part separating the solution and powder of the solid to be extracted, and the separated solution entering the liquid storage part;

S320: the energy generation device below the partition emitting energy, bursting the nanobubbles in the solution;

S330: the second conveyor drawing the solution in the liquid storage part and dripping the solution through the third duct into the extraction part for re-mixing with the solid to be extracted;

S340: repeating steps S310-S330 until nanobubbles in the liquid completely burst.

In conclusion, the present disclosure provides an open extract beverage dispenser and method for using the same. A storage device of the present disclosure produces and stores liquid with nanobubbles, an extraction device is installed with an extraction part where a solid to be extracted is placed and a liquid storage part that accommodates the extraction part, and the storage device and extraction device are connected by a connection and circulation device. The extraction part and the liquid storage device are connected by a first conveyor in the connection and circulation device, which channels the liquid with nanobubbles to the extraction part for mixing with the solid to be extracted; the extraction part and the liquid storage part are connected by a second conveyor in the connection and circulation device, which re-channels solution in the liquid storage part to the extraction part for re-mixing with the solid to be extracted. Extraction of the solid by circulating the liquid with nanobubbles realizes the complete bursting of nanobubbles in the liquid, reducing the extraction time and increasing the extraction efficiency while ensuring the texture of the beverage.

It should be understood that the applications of the present disclosure are not limited to the aforementioned examples. Those of ordinary skill in the art may make improvements or changes based on the above description, and all these improvements and changes shall fall within the scope of protection of the appended claims of the present disclosure.

What is claimed is:

1. An open extract beverage dispenser, comprising:

a storage device connected to an airpump, used to produce and store liquid with nanobubbles;

a connection and circulation device, of which one end is connected to the storage device;

an extraction device, which is connected to another end of the connection and circulation device, the extraction device comprises an extraction part where a solid to be extracted is placed and a liquid storage part that accommodates the extraction part, the liquid with nanobubbles flows into the liquid storage part from the extraction part after an extraction of the solid to be extracted; and the connection and circulation device comprises a first conveyor and a second conveyor, wherein the first conveyor connects the extraction part and the liquid storage device and channels the liquid with nanobubbles into the extraction part for mixing with the solid to be extracted, the second conveyor connects the liquid storage part and the extraction part and re-channels solution in the liquid storage part into the extraction part for re-mixing with the solid to be extracted;

wherein the extraction device further comprises an energy generation device, which is installed below the extraction part and is used to emit energy to accelerate the bursting of nanobubbles of solution in the extraction part and the liquid storage part.

2. The open extract beverage dispenser according to claim 1, wherein the extraction device further comprises:

a partition, which is snap-fit in the liquid storage part, installed between the extraction part and the energy generation device, and in direct contact with a bottom of the extraction part, the solution flows into the space above the partition in the liquid storage part from the extraction part after the extraction of the solid to be extracted using liquid with nanobubbles; and a first duct, which penetrates the partition, the solution stored in a space above the partition in the liquid storage part enters a space below the partition in the liquid storage part through the first duct.

3. The open extract beverage dispenser according to claim 2, wherein the liquid storage part comprises:

a liquid outlet, which is installed at a bottom of the liquid storage part;

a three-way device, which is installed below the partition, a first end of the three-way device is connected to the first duct of the partition, a second end of the three-way device is connected to the second conveyor, a third end of the three-way device is connected to the liquid outlet; and a control valve, which is installed at one side of the three-way device and connected to the three-way device to control a flow of the three-way device.

4. The open extract beverage dispenser according to claim 1, wherein a top cover is set above the extraction device and the top cover is embedded with a second duct and a third duct, one end of the second duct is connected to the first conveyor, an other end of the second duct is installed at a top of the extraction part and used to drip the liquid with nanobubbles into the extraction part; one end of the third duct is connected to the second conveyor, an other end of the third duct is installed at the top of the extraction part and used to drip solution in the liquid storage part into the extraction part.

5. The open extract beverage dispenser according to claim 1, wherein the air pump is further set at a top of the connection and circulation device, the air pump is connected to the storage device and is used to deliver air to the storage device for a production of nanobubbles.

6. The open extract beverage dispenser according to claim 5, wherein the storage device comprises:

a storage part, which is installed above the storage device, connected to the first conveyor, and used to store the liquid with nanobubbles;

a nanobubble production device, which is installed below the storage part and used to convert air delivered by the air pump into nanobubbles for mixing with liquid, so as to obtain the liquid with nanobubbles; and a power supply device, which is installed below the nanobubble production device and connected to an external power source to supply energy to the open extract beverage dispenser.

7. The open extract beverage dispenser according to claim 1, wherein the first conveyor and the second conveyor are liquid drawing power devices and side walls and bottom of the extraction part are filter mesh.

* * * * *